Dec. 15, 1964  G. G. HOBERG ETAL  3,161,765
ELECTRONIC ADDER USING TWO DECADE COUNTERS ALTERNATELY
Original Filed March 4, 1955  14 Sheets-Sheet 2

Dec. 15, 1964   G. G. HOBERG ETAL   3,161,765
ELECTRONIC ADDER USING TWO DECADE COUNTERS ALTERNATELY
Original Filed March 4, 1955   14 Sheets-Sheet 3
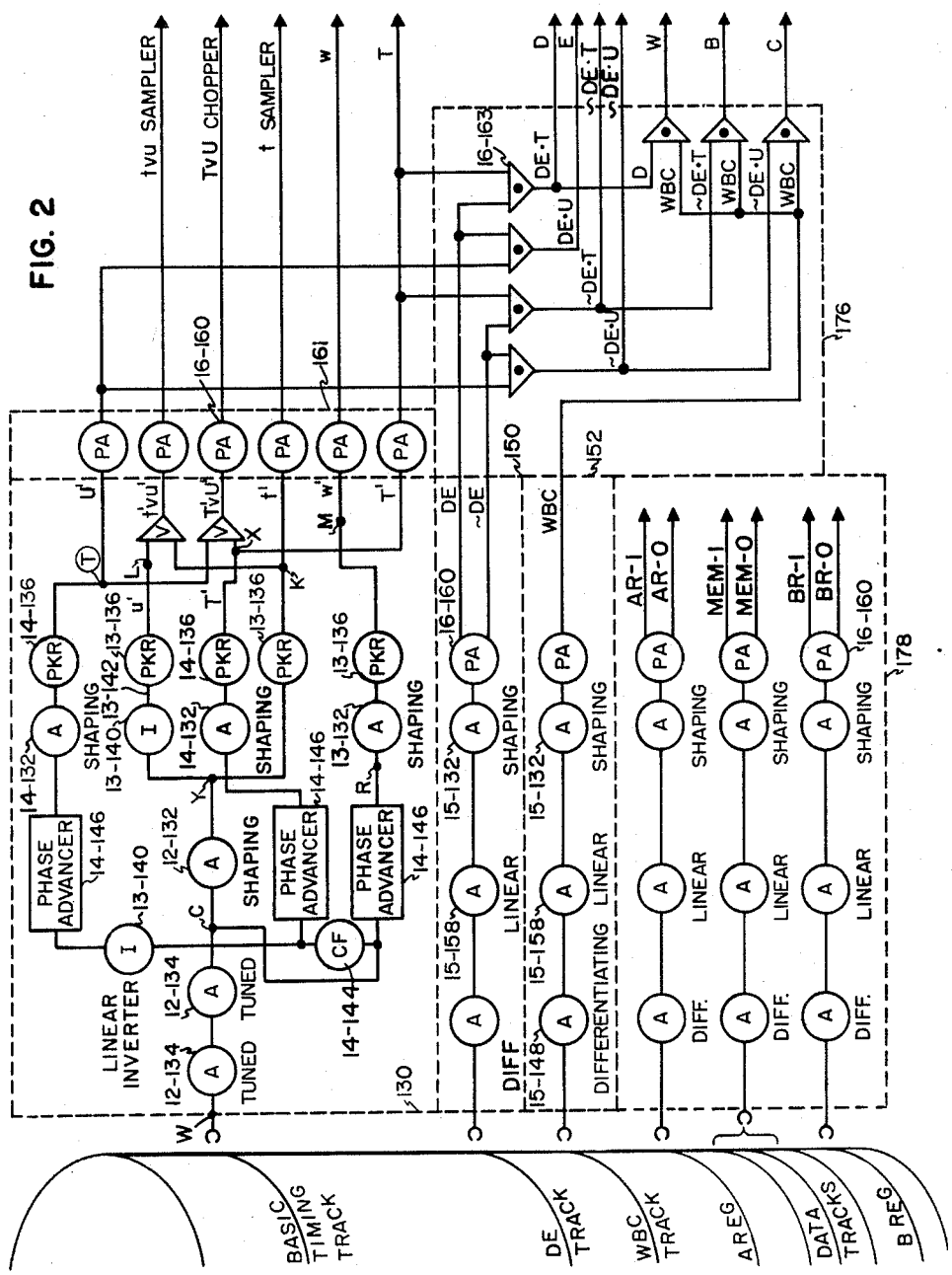

Dec. 15, 1964 G. G. HOBERG ETAL 3,161,765
ELECTRONIC ADDER USING TWO DECADE COUNTERS ALTERNATELY
Original Filed March 4, 1955 14 Sheets-Sheet 9

Dec. 15, 1964   G. G. HOBERG ETAL   3,161,765
ELECTRONIC ADDER USING TWO DECADE COUNTERS ALTERNATELY
Original Filed March 4, 1955   14 Sheets-Sheet 10

ACCUMULATOR INPUT    FIG.14

3,161,765
ELECTRONIC ADDER USING TWO DECADE
COUNTERS ALTERNATELY
George G. Hoberg, Devon, Pa., John R. Van Andel, Dearborn, Mich., and Edward W. Veitch, Rosemont, Pa., assignors to Burroughs Corporation, Detroit, Mich., a corporation of Michigan
Original application Mar. 4, 1955, Ser. No. 492,062, now Patent No. 3,053,449, dated Sept. 11, 1963. Divided and this application Apr. 20, 1961, Ser. No. 104,363
23 Claims. (Cl. 235—176)

This invention relates to electronic computers and more particularly to the arithmetic system of a general-purpose computer. This application is a division of the co-pending application for patent, Serial No. 492,062, filed March 4, 1955, by George G. Hoberg et al. for an "Electronic Computer System," now Patent No. 3,053,449, and assigned to the same assignee as the present application. In the "Electronic Computer System" of the parent application, a highly flexible general-purpose computer is disclosed which includes the present invention and its interconnections into a complete computer system. The entire above-identified parent application is hereby incorporated as forming a part of the description of the present invention.

In general, electronic arithmetic systems are designed to perform the sole operation of adding two numbers. When it becomes necessary to subtract, multiply or divide, the arithmetic system essentially performs in the same manner as a basic adder system. Ordinarily, arithmetic systems store the sign of the digits being operated upon with the digits in the adder. Should the sum or result in the adder be in a negative form, the adder sum or result must be complemented if a positive sum is desired. Serial adders are generally provided with means for sensing an overflow to indicate improper operation. In order to perform correctly such serial adders must arrange a larger minuend digit than the subtrahend digit if the adder is to avoid sensing overflows caused by correct operations. Serial adders may compare the magnitudes of the minuend and subtrahend after an overflow has occurred to determine if the overflow was proper, but in either case a separate and distinct operation of sensing the relative digit magnitudes is required. Generally serial pulse count adders require at least one stage of adder for all digits to be added in order to add one digit from the addend to a sequentially presented digit from the augend thus requiring two digit times in each of the adder. In such adders the digits are not fed into the pulse count adder simultaneously or during the same digit time.

Prior art carry registers were part of the adder and were not used as a part of the complement control means to indicate correct arithmetic operations when the adder was purposely caused to overflow, nor was a single carry register common to two stages of an adder.

It is, therefore, an object of this invention to provide a new and improved electronic arithmetic adder for an electronic computer system.

Another object of the invention is to provide a simplified pulse coded arithmetic adder which operates in association with recording recirculating and shifting circuit means.

A further object of the invention is to provide an electronic arithmetic adder which operates as a selective buffer storage register, and allows simultaneous entry of digits.

A further object of the invention is to provide an improved adder system which senses the sign of the input digits to determine the sign of the result, and further verifies whether or not the original determination is correct.

A further object of the invention is to provide an improved sign sensing circuit in the adder which automatically produces a positive magnitude digit and eliminates negative zeros before the digits are sent to storage.

A further object is to provide an improved sign sensing and storing device which cooperates with the carry register of the adder to perform complement control and operational check functions.

The adder system of the present invention performs the operation of an arithmetic adder and the further function of a storage register eliminating the need for extra registers ordinarily required during multiplication and division operations. The storage register feature of the adder system is also used as a buffer register when data is being transferred into or out of the system, thus eliminating the need for additional buffer registers.

In the improved arithmetic system the sign of the adder is stored externally in a sensing circuit which performs a complement control function upon the data digits entering the arithmetic system. The sign sensing circuits are further operable to determine whether or not the sign of the sum or result in the arithmetic system is a negative or zero magnitude. Then these circuits control the output from the arithmetic system so that only absolute quantities and positive zeros are sent to the memory storage of the computer system with the correct sign affixed to the digit data.

Accordingly, in a preferred embodiment of the invention there are provided four stages of novel electronic counters operable in pairs to receive and store temporarily the inputs to the adder. One of the input pair of counters is operable to receive pulses representing an augend digit and simultaneously receive interposed pulses representing an addend digit and to store the sum of such input in the form of a partial sum and carry. The other counter of this input pair is operable to receive alternate input digits to the adder. During any arithmetic operation one counter of this first input pair is receiving the input to the adder while simultaneously the other counter of the input pair is operable to count out the pulse sum and carry previously received. The second input pair of counters is selectively connected to receive the output of the first pair of input counters to perform single or double buffing action in the adder system.

Thus, in accordance with this invention there is provided an improved electronic adder circuit for adding a plurality of sequentially presented pulse count decimal digits representing two words, including two decimal counters, means for storing alternate decimal digits presented in sequence throughout the duration of the words into respective ones of the counters, and means for alternately counting out and recombining in sequence the digits stored in the decimal counters.

A more detailed description of the electronic arithmetic system comprising the present invention follows hereinafter with reference to the accompanying drawings, wherein:

FIG. 2 is a logical block diagram of signal processing circuits for stored timing and data information in the computer of FIGS. 1a and 1b;

FIG. 4a is a circuit diagram of a logical diode buffer gate used throughout the computer;

Figure 1A:
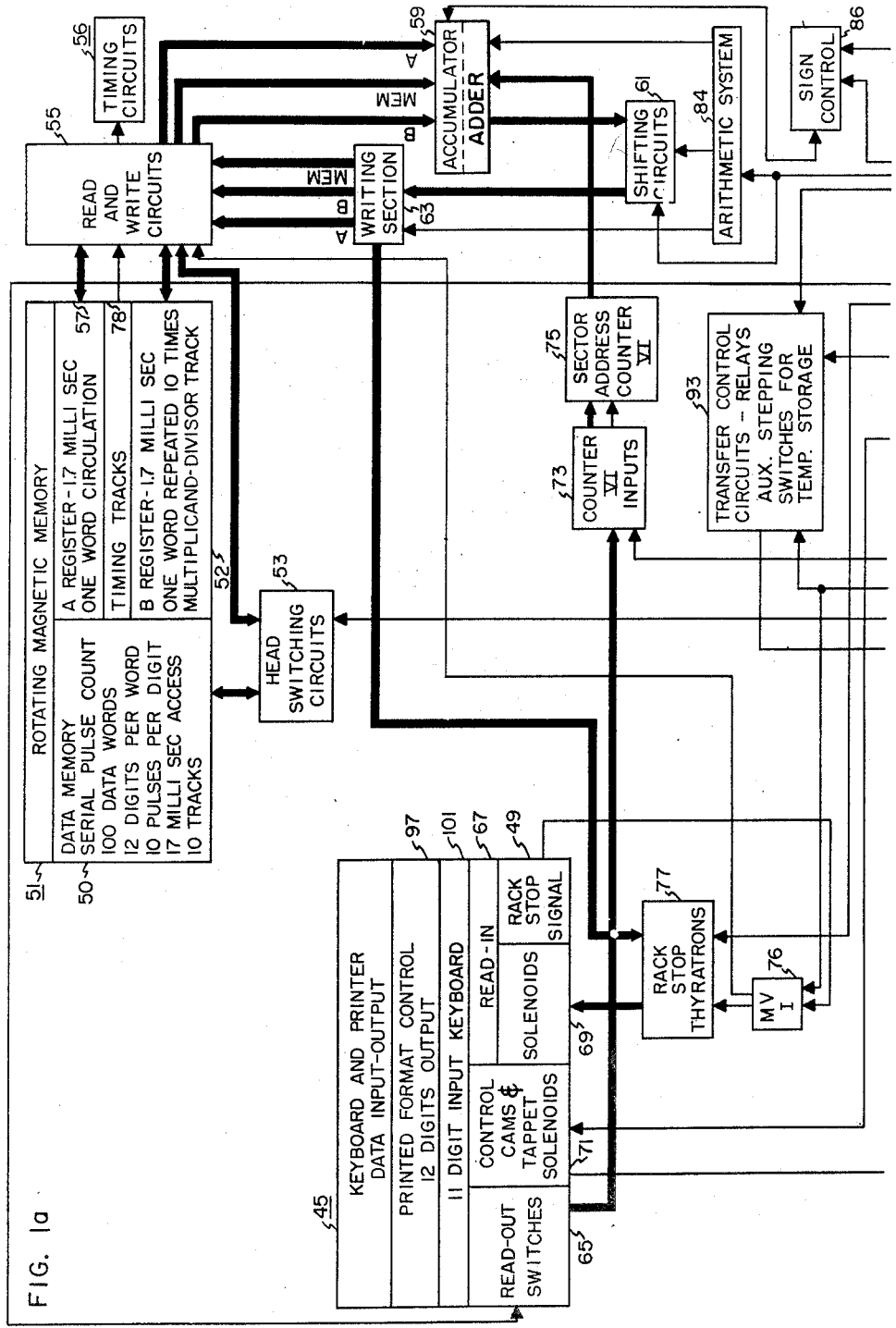
FIGS. 1a and 1b show in detailed block diagram form the relationship of different functional units of a computer.

In order to set forth a detailed description of a preferred embodiment of the present invention, a portion of the specification and drawings of the computer system comprising the above-identified parent application is utilized in the detailed description of the present invention given herein below. In order to facilitate comparison of circuits throughout the computer, like elements are given similar suffix reference characters. In view of the complexity of the system, descriptive legends are used in connection with some of the figures to enable corresponding circuitry to be compared without detailed reference to the specification. Also sub-headings are used in the specification to more readily direct attention to different sections of the computer system.

Timing Circuits

Figure 3:
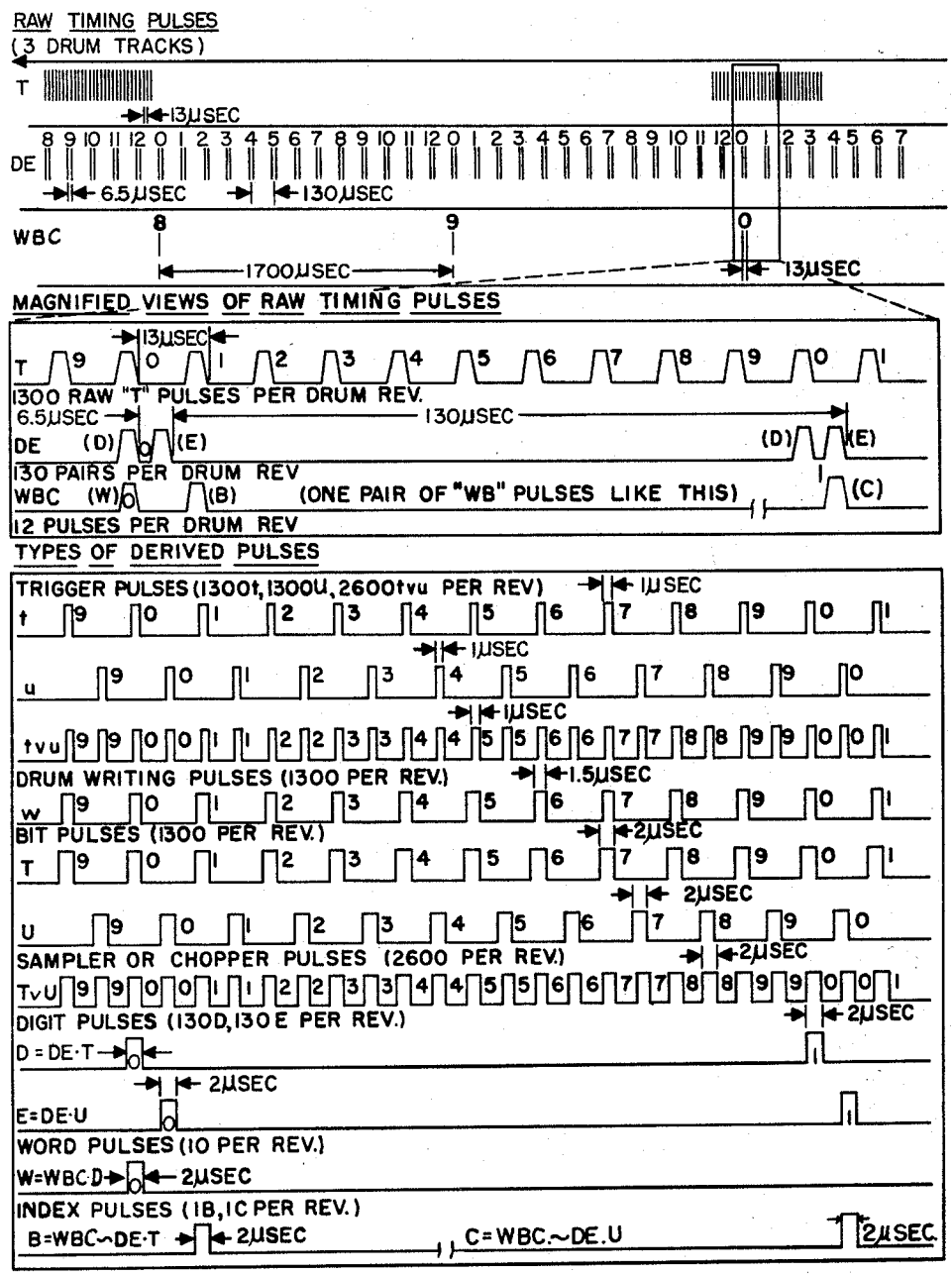
FIG. 3 is a waveform diagram of timing pulses used in the computer shown in FIGS. 1a and 1b for scheduling operation.

All of the arithmetic operations are timed by means of signals derived from permanently stored timing signals in the memory section 3-78 with circuits located in the read section 3-55 and processed in the timing circuit section 3-56 of FIG. 1a. These timing circuits 3-56 are shown in block diagram form in FIG. 2. The waveforms corresponding to the stored timing signals and the outputs created by the timing circuits 3-56 in FIG. 2 are illustrated in FIG. 3. The block diagram circuits of FIG. 2 are discussed together with timing pulse characteristics of both the raw recorded pulses and those timing pulses derived therefrom as indicated by the waveforms of FIG. 3. The basic timing track shown diagrammatically in FIG. 3, has 1300 raw timing pulses T spaced at thirteen microsecond intervals which are used to derive pulses for synchronous operation of the computer shown in block diagram form in FIGS. 1a and 1b at approximate bit frequencies of either 78,000 or 156,000 cycles per second. The raw timing pulses T are used in the basic timing section 10-130 for deriving a series of shaped pulses $t$, $u$, $tvu$, T, U, TvU, and W. The timing and widths of these pulses, together with an indication of the timing of the decimal pulse count notation in the computer system are seen in the waveforms of FIG. 3. From the corresponding letter notation at the output leads of the basic timing section 10-130 each timing signal may be traced back to the basic timing track through the processing circuits. Thus, as an illustration, the raw basic timing pulses T are fed to input W through the two stage tuned amplifier circuit 12-134 to produce a sine wave output signal at terminal C. This terminal C is indicated in FIG. 2 at the output of tuned amplifier 12-134. Shaping of the sine wave signal at terminal C of FIG. 2 is performed by overdriving a biased triode amplifier 12-132. This effectively converts the sine wave output signal of the intermediate tuned amplifier 12-134 of FIG. 2 to a shaped wave at the output terminal Y of FIG. 10 of the overdriven shaping amplifier 12-132, from which is derived in further circuits the one microsecond wide $t$ and $u$ pulses shown diagrammatically in FIG. 3.

The shaped wave at terminal Y, of FIG. 2, is further processed to produce at the output terminal K the $t'$ timing pulse shown in FIG. 2.

To form the $u'$ timing pulse, an inverter circuit is used to produce an input signal at lead 13-142 to a peaking circuit 13-136 to produce at the output terminal L, of FIG. 2, the shaped $u'$ timing waveform. Thus, by utilizing the reverse half cycle of the available shaped sine wave, the $t$ and $u$ clock pulses are caused to be interspersed with each other, as shown in FIG. 3.

The $w'$ drum writing signal, FIG. 2, is derived also from the sine wave signal at terminal C. The input, terminal C of FIG. 2, of the overdriven amplifier 12-132 is delayed by means of a suitable phase advancing circuit similar to 14-146 which produces at terminal R a timing pulse which has a leading edge starting one-half of a microsecond before the corresponding $t'$ pulses. The pulse forming circuit 13-132 is tuned to produce a one and a half microsecond pulse. The $w'$ pulses last for a duration of one and a half microseconds, and are therefore suitable for actuating circuits for writing upon the magnetic drum. In the computer system these wider pulses permit the storage of more energy. The peaker stage 13-136 further shapes the $w'$ waveform to produce output pulses at terminal M.

The further two microsecond wide clock pulses T' and U', FIG. 2, are derived from the sine wave produced at the input terminal C. A cathode follower circuit 14-144 couples the sine wave signal to two separate processing channels for the respective clock pulses T' and U'. An inverter circuit 14-140 serves to intersperse the U' pulses with the T' pulses by utilizing a different half cycle of the sine wave input signal. By means of the interposed phase advancing circuits 14-146 the sine wave signal is caused to trigger off the overdriven amplifiers 14-132 soon enough to cause the T' and U' pulses to be derived one microsecond before the beginning of the $t'$ and $u'$ pulses, respectively, and damped resonant pulse forming circuits 14-132 are tuned to produce pulses of two microseconds duration.

Signal Processing Circuits

Some of those circuits described in connection with the basic timing processing circuits 10-130 are likewise used for processing the other timing track and data track signals in sections 10-150, 10-152 and 10-178 of FIG. 2. A differentiating amplifier 15-148 is used in the memory reading stage of the amplifier circuits in reading sections 10-150, 10-152, and 10-178. Thus, the output pulses are differentiated as applied to the cascade coupled linear amplifier circuit 15-158. The pulses are then shaped in the overdriven amplifier 12-132.

These shaped signals are further processed through the pulse amplifier circuit 16-160 as are the signals derived from the basic timing track as indicated in the pulse amplifier circuit portion 10-161. As is well known, after a pulse has passed through several diode logic stages, inherent circuit delays cause the pulse to be spread out and mis-shaped. Thus, fresh timing of the input signals with an appropriate clock pulse is accomplished by means of the diode "and" circuit 16-163.

The various combinations of timing pulses which are necessary at different stages of the computer for proper operation are derived in the "and" circuits of the processing section 10-176 of FIG. 2. Since digital information is handled throughout the computer system, the data-tracks derive similar shaped pulses in the "and" circuits 16-163 of the data section 10-178.

Figure 4:
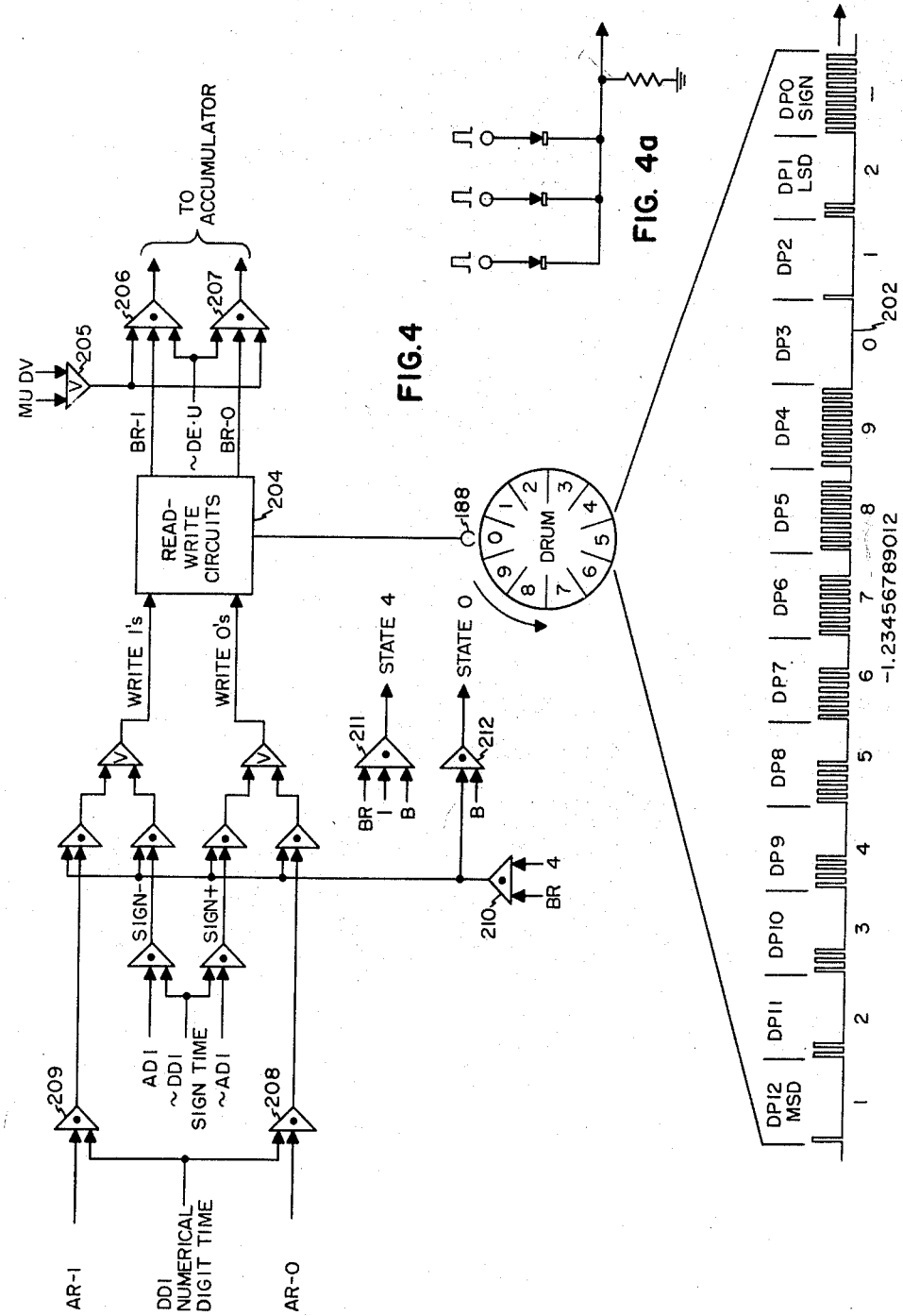
FIG. 4 is a schematic circuit of a B register showing input and output logical gates.

The organization of a B register is shown in the logical diagram of FIG. 4. In general, the B register is used during multiplication and division for storing either the multiplicand or divisor word. The word enters an B register from the accumulator and is recorded 10 times around the B register track so that access may be accomplished within one-tenth of the drum rotation. A typical word, as stored upon each drum sector, is indicated by the waveform 19-202. This waveform typifies the words stored and used throughout the computer. As the drum rotates, the first decimal digit DP0, which represents the sign, is presented in each sector. The sign is represented by nine "1" pulses for negative sign and nine "0" pulses for a positive sign.

Between each digit space, which contains zero to nine recorded bits, is a guard cell so that ten complete recording bit spaces are used for each decimal number. Next in succession after the sign digit DP0 is the least significant digit DP1 of the recorded word, which in this illustrative case is a two and is represented therefore by two "1" pulses in the pulse count notation used throughout the system. Each decimal digit is then read in succession until the most significant digit DP12 is reached. For all computations the decimal point is fixed between the most significant digit DP12 and the next most significant digit DP11. Thus, in the B register track of the drum, the same word would be written in all ten sectors and therefore would be available at the reading head 19-188 with a maximum access time of approximately 1.7 milliseconds for a drum revolution of 3600 r.p.m.

Signals to and from the transducing head 19-188 are processed in the read-write circuit section 19-204. Since the information is read out of the B register at T time, a suitable delay means (not shown) is interposed to delay the information 6.5 microseconds to make it available at U time. Separate output signals go to an accumulator register from the B register for both "0" and "1" recorded information, as indicated by the notation BR-0 and BR-1. Since the B register is read only during multiplication or division, the "or" circuit 19-205 produces signals derived from the computer instructions for actuating the output gating circuits 19-206 and 19-207 as will be explained in conjunction with FIG. 13. This "or" circuit is constructed similar to that shown in FIG. 4a, as are similar "or" circuits throughout the computer. Thus, by means of a positive pulse at any one or more of the diode anodes of FIG. 4a, the potential at the output terminal is raised due to conduction through the load resistor to the ground terminal. As shown in FIG. 4, the coincidence of either the multiply or the divide instructions with information BR-1 or BR-0 from the B register and clock pulses ~DE.U which occur at each U time except the sign time U0, produces corresponding output signals which are sent to the accumulator as will be explained in conjunction with FIG. 13. Therefore, during the receipt of clock pulses ~DE.U, shown in FIGS. 2 and 3, any recorded B register information, excepting signs, is read out through gates 19-206 and 19-207 into the accumulator in response to a multiply or divide signal received at the input "or" circuit 19-205.

Figure 1B:
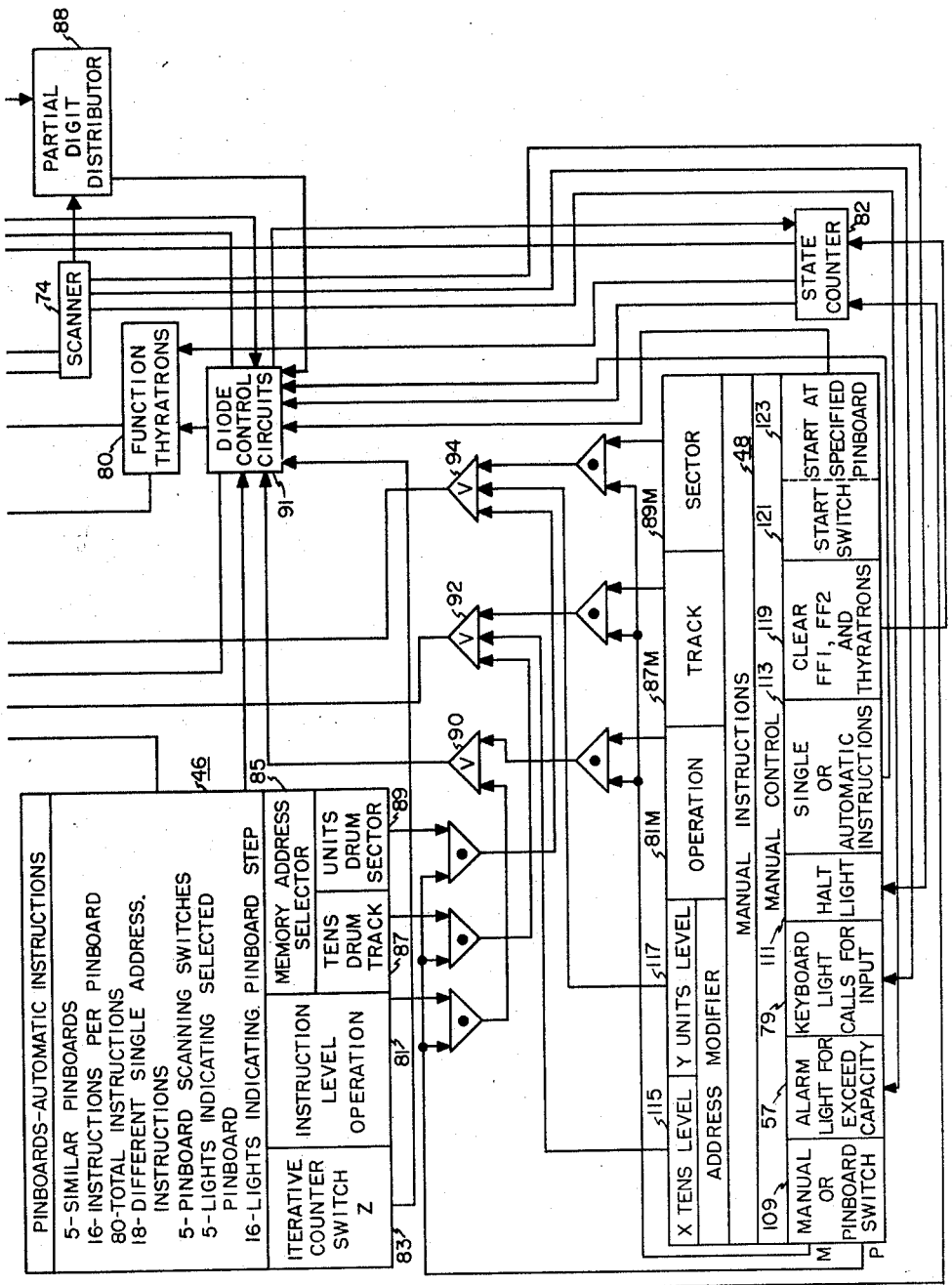
Figure 12:
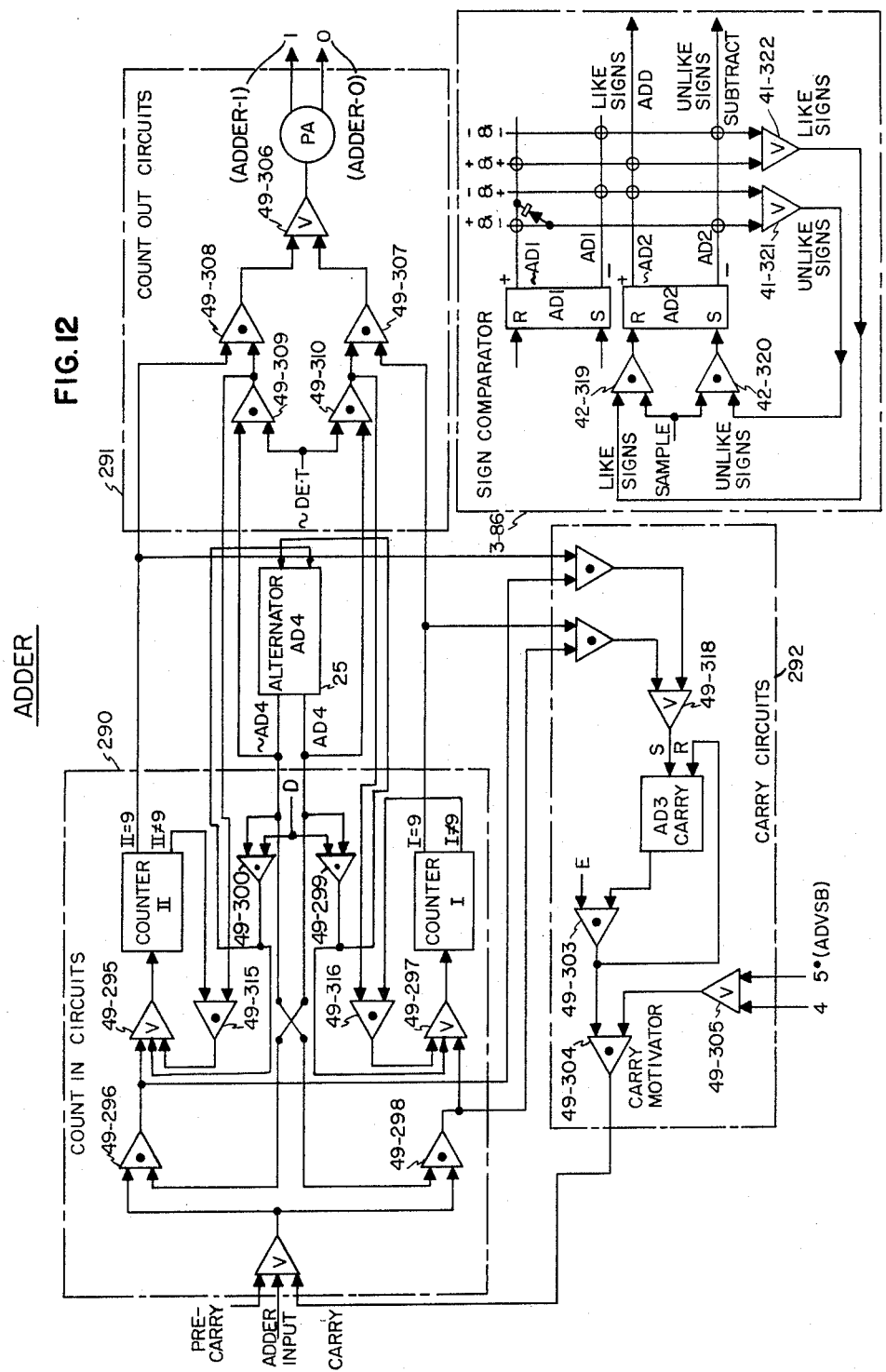
FIG. 12 is a schematic diagram of the accumulator-adder and sign comparator.

In order to write upon the B register, FIG. 4, separate circuits are supplied for writing both the "1" and "0" bits. The input information which appears at 19-204 is taken from an accumulator loop or A register, FIG. 13, as designated by the input notation AR-1 and AR-0. In the partial digit distributor 3-88, FIG. 1b, is a flip flop circuit DD1 shown in FIG. 6, which is used for distinguishing between the time of occurrence of the sign digit DT0 and numerical digits DT1 through DT12. Thus, the DD1 input signal is used to gate input digits from the A register at the input write gating circuits 19-208 and 19-209. The sign is separately processed and stored in a sign control flip flop 3-86, FIG. 1a, which is designated AD1 as shown in FIG. 12. Therefore, the ~DD1 signal is used to gate the DT0 digit containing the respective minus or plus signs of the words to be written at the proper digit time DT0 at the respective write "1" and write "0" input leads to the read-write circuits 19-204.

Information to be written into the B register is always transferred from the A register, the transfer taking place during state 4. When the B register instruction is set up an instruction signal BR conditions the write circuits 19-204. An instruction signal BR designating the B register write operation is necessary at the control gate 19-210 in order to permit writing upon the B register drum track. The computer automatically steps from state 0 to state 1, and reads the B register instruction. In coincidence with the B register control instruction BR, the computer must be in state 4 in order to permit writing upon the drum, as seen in FIG. 4. State 4 starts with the B timing pulse, shown in FIGS. 2 and 3. In order to arrive at state 4 from state 1 the coincidence of a B timing pulse with a state 1 condition and a B register instruction BR at the state control gate 19-211 is used to change the control to state 4. The next B pulse after the end of the full revolution which permits the entire word in the accumulator to be written upon the B drum, utilizes a further state control gate 212 to change the computer state to the 0 idling state. Accordingly, state 4 both starts and ends with successive B pulses. The word is written entirely around the B register, and is retained in the accumulator for further use. In this manner information processed in the accumulator loop may be entered upon the B register for use in connection with the multiplication and division computations.

Figure 5:
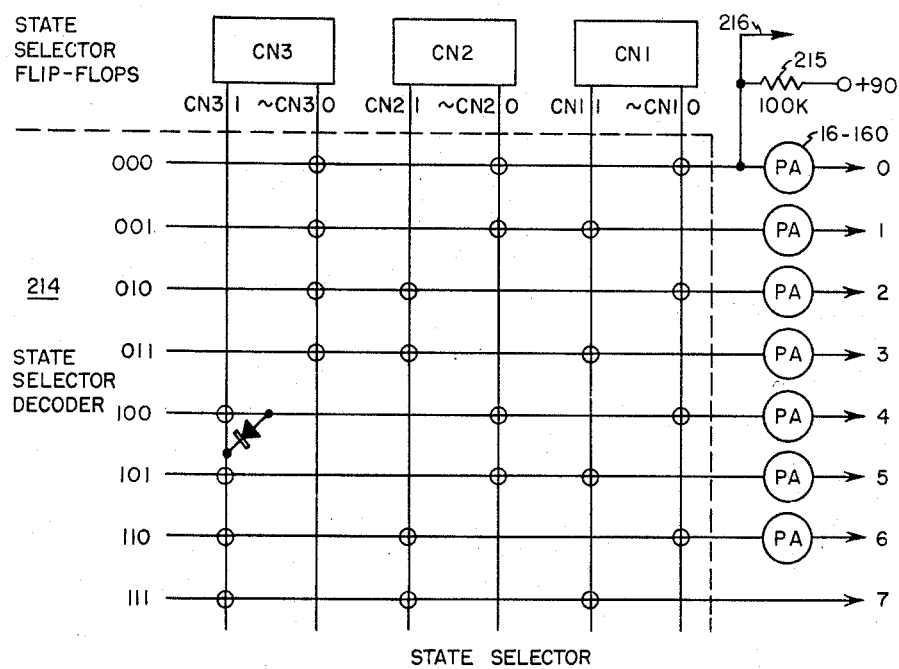
FIG. 5 is a logical block diagram of the computer state selector circuit.

In general, the control of the different computer states is selected by means of three flip flop circuits as shown by the block diagram of FIG. 5. The flip flop circuits are designated respectively CN1, CN2 and CN3 and may be constructed in the general manner shown schematically in the hereinafter described circuits of FIG. 10. By presetting the three flip flops, hereinafter called the "state counter," any one of eight computer operating states may be selected. The conventional diode matrix decoder circuit 20-214 is used to separate the eight output signals which are coupled to the respective pulse amplifiers 160.

The matrix circuit 20-214 has a plurality of output rows, each coupled to a suitable power terminal by a resistor 20-215 as shown typically for the row 000 for state 0. Thus, output signals are produced at each row only upon the coincidence of signals at all of the diode connections to the columns as schematically shown in the matrix by means of circles. Output signals from each output lead may be taken directly for use without pulse amplification by means of a lead 20-216 where desired. Thus, the hereinbefore described state control gate 19-211 in FIG. 4 will serve to establish state 4, during state 1 of the B register operation, by resetting the flip flop CN1 and setting flip flop CN3 to establish an 001 condition. In operation of the state counter only the necessary changes in the flip flop conditions will be made to change from one state to another. Thus, if the computer was changed from state 1 to state 4 the only changes in the state selector flip flops would be the setting of flip flop CN3 to its "1" condition, and resetting the flip flop CN1 to its "0" condition. Likewise, the state control gate 19-212 in FIG. 4, in returning the computer from state 4 to state 0, would serve only to reset flip flop CN3 to its 0 state.

Figure 6:
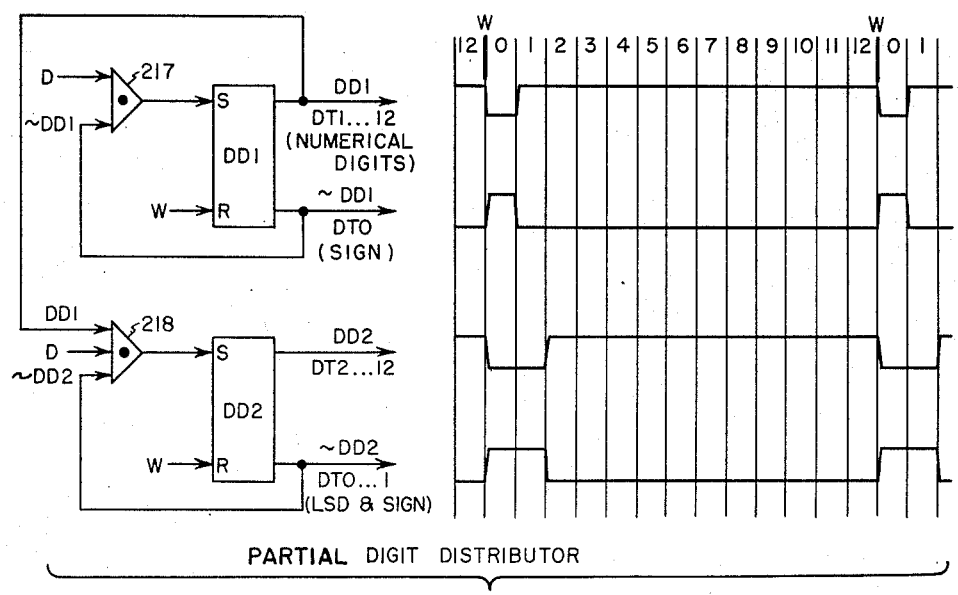
FIG. 6 is a combined block and waveform diagram of a digit distributor circuit used in the computer.

Construction of the partial digital distributor 3-88, which generates pulses DD1 and DD1, as described in connection with FIG. 4, is indicated in FIG. 6. The first of the two flip flop circuits DD1 and DD2 is utilized in order to distinguish between the sign digit time DT0 of each decimal word and the remaining numerical digit times DT1 through DT12. The output signal of flip flop DD1 is used to provide this information both in the positive sense DD1 and negative sense DD1. This flip flop circuit DD1 is reset by each word pulse W and is set by the first digit pulse D after the W pulse in combination with a DD1 signal showing that the flip flop circuit is in its reset condition, as controlled by gate 21-217.

For further machine processing the partial digit distributor also produces an output signal which occurs during the least significant digit time DT1 and the sign time DT0 as accomplished by the flip flop circuit DD2 of FIG. 6. Similarly, this flip flop circuit is reset with the word clock pulse W. A control gate 21–218 is used for setting the flip flop when it is in its reset condition DD2. Thus, in response to a digit timing pulse D arriving when both the DD1 and DD2 signals are available, the flip flop circuit DD2 is set to as to be in the rest condition only for the periods DT0 and DT1 of two digit pulses D arriving immediately after the word pulse W.

Figure 7:
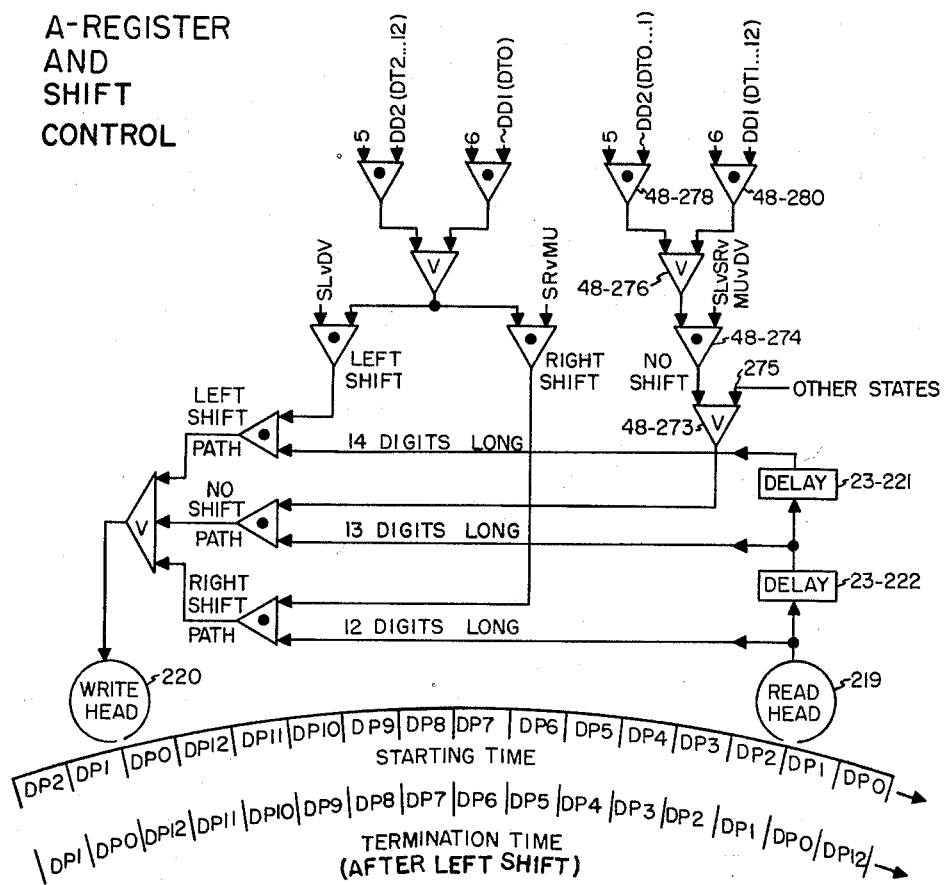
FIG. 7 is a schematic circuit of the A register showing the logical diode shift control gates.

The accumulator-adder 3–59 together with the shifting circuit 3–61 are shown in logical form in FIG. 7 to indicate the manner of circulation and modification of information picked up at the reading head 22–219 and rewritten by the writing head 22–220. Each word, as stored in the entire accumulator loop, has 12 decimal digits plus an unused sign digit space, one of which is stored in delay 23–222 for normal no-shift operation, and twelve of which are found recorded on the drum surface located between the read and write heads 219 and 220. The storage of one digit in delay 23–222 permits precession of information about the accumulator loop by direct coupling, in order to provide the shift right operation, bypassing the one digit delay. An additional delay of one digit is incorporated in an alternate circuit path for obtaining shift left sequencing. The result of this latter operation is indicated by the comparison of the two words located between the read heads at the starting and termination of one period of left shift. Thus, the normal accumulator circulation path is from the read head 22–219 through the normal one digit delay circuit 23–222 through the no-shift path and back to the write head 22–220 as controlled by a no-shift input instruction through the "or" circuit 22–273.

Figure 14:
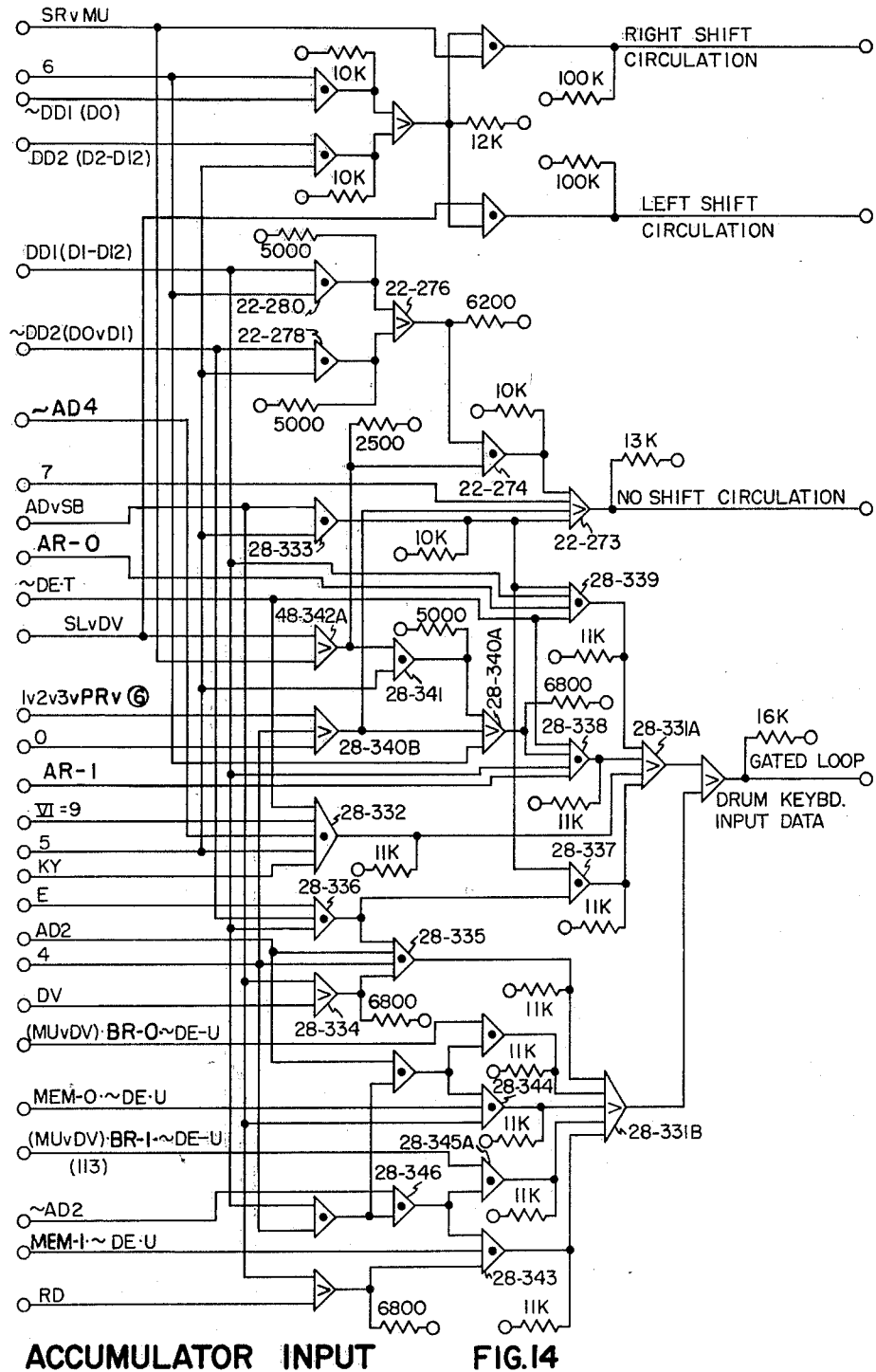
FIG. 14 is a logical circuit diagram of control inputs to the accumulator loop circuits of FIG. 13.

The no-shift signal is derived from computer circuit logic in response to various input conditions at the "or" circuit 48–273, shown in FIG. 14. For example, in FIG. 7, shifting during multiplication is partially done in state 5 with the ~DD2 signal identifying digit times DT0 and DT1 causing the no-shift signal to be excited at the gate 48–274 by way of the mixer circuit 48–276. Thus, coincidence with the further control signal SLνSRνMUνDV at gate 274 is required. Likewise, in multiplication, state 6 causes similar action to take place at gate 48–280 in combination with the DD1 signal, which identifies digit times DT1 through DT12. The control signal at gate 48–274 is derived from multiply (MU), divide (DV), shift left (SL) or shift right (SR) instructions. More detailed disclosure of this circuitry together with the other states which will cause no-shift operation as designated by lead 22–275 is found in the detailed logic circuits in FIG. 14 of the diode circuit section 3–91.

Figure 13:
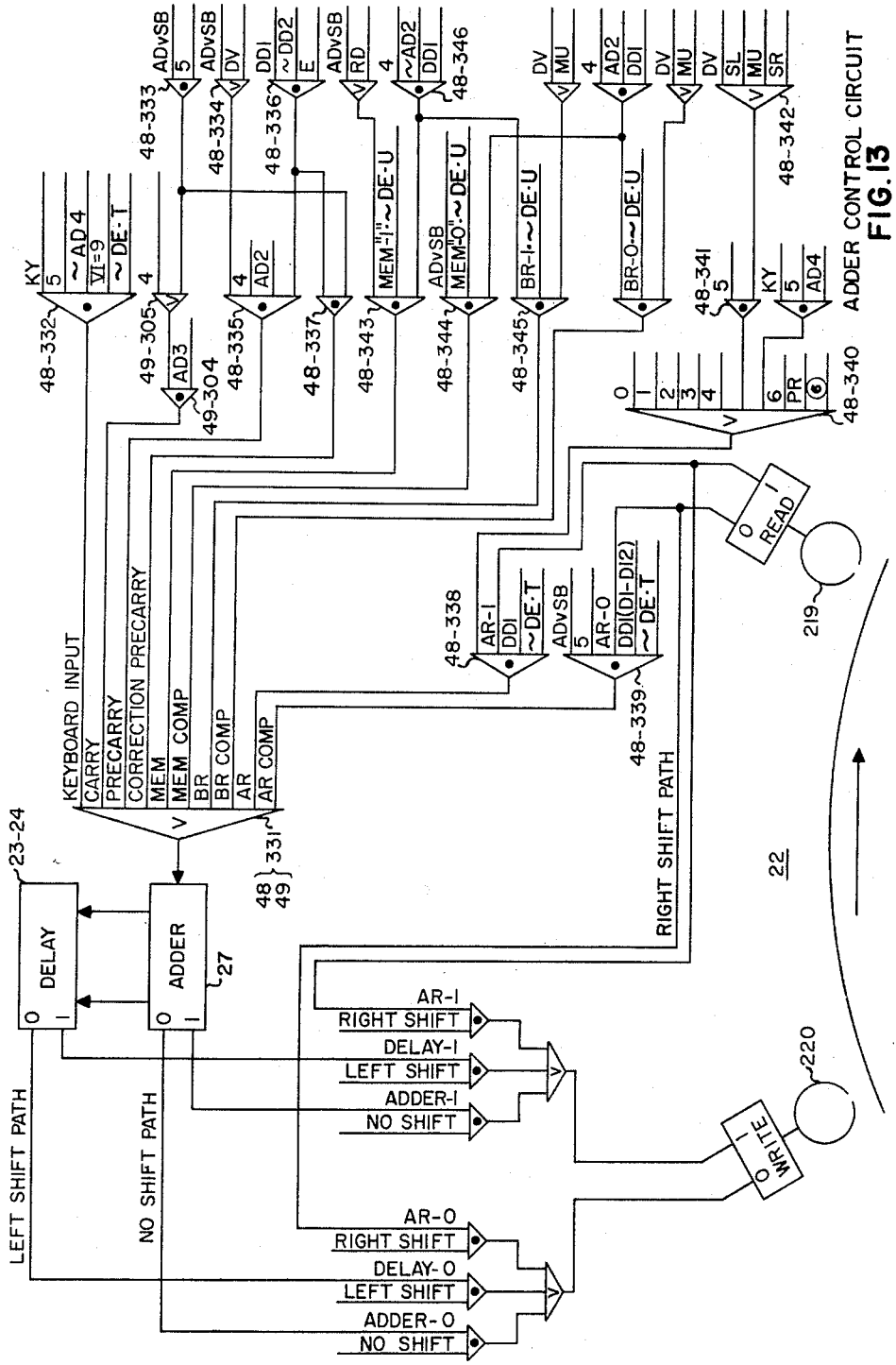
FIG. 13 is a block diagram of the adder control circuits and the accumulator loop.

Similar operation in response to the shift left and shift right instructions are derived as shown in FIGS. 7, 13 and 14. The mode of circuit operation may be readily deduced from the signal notation and diode switching circuits shown in FIG. 7 and FIG. 14. In general, throughout the specification in order to simplify the presentation, where the notation and diode logic circuits are clearly disclosed in the drawing, a detailed description of every electrical circuit element is not presented. Logical circuits are described wherever necessary to explain the circuit operation or to enable a similar analysis of other related logical circuits. It is clear, however, that in the present state of the art, logical circuit diagrams presented herewith are sufficient to explain the operation of the invention described and claimed herein.

As shown in the waveforms of FIG. 3, the drum writing pulses w are formed with a leading edge occurring before that of the corresponding clock pulses t. This serves the purpose in the shift control circuits of FIG. 7 of making the regenerative drum loop head spacing and circuit delay configuration less critical. Because the data recirculates, even a very small change in delay between the three optional circuit loops will cause enough precession to be built up to cause erroneous circuit operation unless the signals are accurately retimed. Thus, the longer drum writing pulses cause the reading head 219 to produce a wide enough signal to be gated precisely at the desired time so that if the heads are accurately spaced, small variations of delay in the three circuits in either direction will be corrected by the retiming action. By causing the leading edge of the w pulses to occur prior to the timing pulses t, the delay variation tolerance in the shift paths may occur in either direction so that the operation of the regenerative shift control circuits is made reliable without the necessity for strict custom adjustments of delay lines in the respective cricuit paths.

The delay circuits of FIG. 7 are shown in more detailed block diagram form in the embodiment of FIG. 8 which will be explained hereinafter. The delay is obtained in binary counters of the type illustrated in block diagram form in FIG. 9 and which are used throughout the computer. This counter provides a decimal count, with output signals available at terminal L indicated for each count of nine input pulses at terminal T. The input counts at terminal T are always clocked by clock trigger pulses at terminal S. The count is made by means of interconnecting the four flip flop circuits as shown diagrammatically in FIG. 9. The last stage of the counter shown in FIG. 9 is constructed similar to the stage shown in FIG. 11. This circuit is generally described in the U.S. Patent No. 2,824,961 issued February 25, 1958, to J. O. Paivinen for "Decade Counter for Producing an Output at the Count of Nine." In this circuit a complete decimal digit of any magnitude may be stored by presetting the counter to the complement of the digit to be stored so that an output signal at the terminal L will be produced at the proper digit count to identify the stored digit. Since this same basic counter is used in the several different counting circuits of the computer, it is shown in its most general form in FIG. 9 and therefore is provided with four preset terminals N, F, D and B, as well as with a clear terminal H. In the normal cleared or "0" state caused either by a clear signal at terminal H or by the counter reaching a count of 10, each of the four flip flops is put in the reset condition. In order to preset the cleared counter at any desired count, the respective flip flop circuits may be set by signals at the appropriate preset terminals N, F, D and B in any one of its possible counts.

In performing the counting operation, input signals are available at the complement terminals C (FIGS. 9 and 10) of the respective flip flop circuits. Thus, the state of the flip flop is changed by a signal at the complement terminal C regardless of the previous storage condition. Input count signals at terminal T are gated by means of the clock pulses at terminal S in the gate circuit 24–283. Thus, the first count signal arriving after the counter is cleared produces at the first counter stage a signal which will transfer that stage from reset to set condition. Since the other three stages are in the reset condition at the arrival of the first count pulse, the signal at the output gate 24–289 as seen at the lead 24–277 is not passed to the nines count output terminal L. The nines count output is generated at terminal L by a pulse amplifier circuit of the type shown in FIG. 16 in the manner shown in FIG. 11, so that negated output signals are produced at the terminal Z, FIG. 11, as well as the normal nines count signals at terminal L. The input to the pulse amplifier is derived from the output of gate 24–289. As shown in FIG. 11, the inputs to gate 24–289 are from the fourth stage and from the first stage of the counter. The B and H inputs of FIG. 11 are the set and reset terminals of the last stage flip flop of the FIG. 9 counter. The negated output signals are used to inhibit the gate 24–279 which allows the counter to be cleared at the count of ten.

The output flip flop is designed basically as shown in FIG. 11 and is described and claimed in the U.S. Patent No. 2,842,662 issued July 8, 1958 to R. J. Williams for "Flip Flop Circuits." At the pulse transformer 26–167 both the nines count output signal, terminal L, and the output signal 9, terminal Z, are obtained.

In general, the delay circuit 24–285 of FIG. 11 prevents the transmission of the output signal from the gate 24–289 until after the expiration of the input pulse which causes the switching of the first flip flop to the set condition. Accordingly, the nines output of gate 24–289 does not coincide with the ninth input pulse and therefore does not permit the premature operation of gates 24–279 and 24–282. The pulse amplifier output signal may be connected back into the counter circuit at terminals L and Z. The L and Z terminals of FIG. 11 are the same as L and Z of FIG. 9.

In FIG. 9 the flip flop output signal at the output lead 24–286 of the first stage will cause switching of the second flip flop stage unless the 9 inhibit signal at terminal Z changes from positive to negative (as occurs at the count of nine). Thus, the transfer path of a switching signal to the second flip flop circuit includes the inhibit gate 279. The second flip flop circuit will cause a binary count with its reset output signal complementing the third flip flop circuit which is likewise connected in cascade circuit with the fourth flip flop circuit. Thus, a normal binary count is effected in the four stages in the presence of pulse 9 so that the fourth flip flop circuit is set with the receipt of the eighth input pulse, but an output signal will not be provided at the count of eight at terminal L because of gate 24–289 where the lead 277 from the first flip flop circuit will not be permissive. When the ninth input counting pulse is received, however, the first flip flop circuit will be switched to its set condition to produce the required signal at lead 277 without upsetting the fourth flip flop state and provides the 9 output signal at terminal L. Because of the absence of ~9 for a count of nine at inhibit gate circuit 279, the binary count of the second state is interrupted for the next (or tenth) input count, when the first stage is reset. Since the second and third flip flop circuits are in the reset state at this time, the tenth pulse arriving at the input terminal of the fourth stage by way of reset lead 24–287 will serve to reset stage four as well as stage one thus returning the entire counter to its cleared condition, and enabling it to perform a further decimal count. Thus, the counting action progresses as shown in the following chart:

| | | | |
|---|---|---|---|
| Reset | 0 0 0 0 | 6 | 0 1 1 0 |
| 1 | 1 0 0 0 | 7 | 1 1 1 0 |
| 2 | 0 1 0 0 | 8 | 0 0 0 1 |
| 3 | 1 1 0 0 | 9 | 1 0 0 1 |
| 4 | 0 0 1 0 | 10 | 0 0 0 0 |
| 5 | 1 0 1 0 | | |

Figure 10:
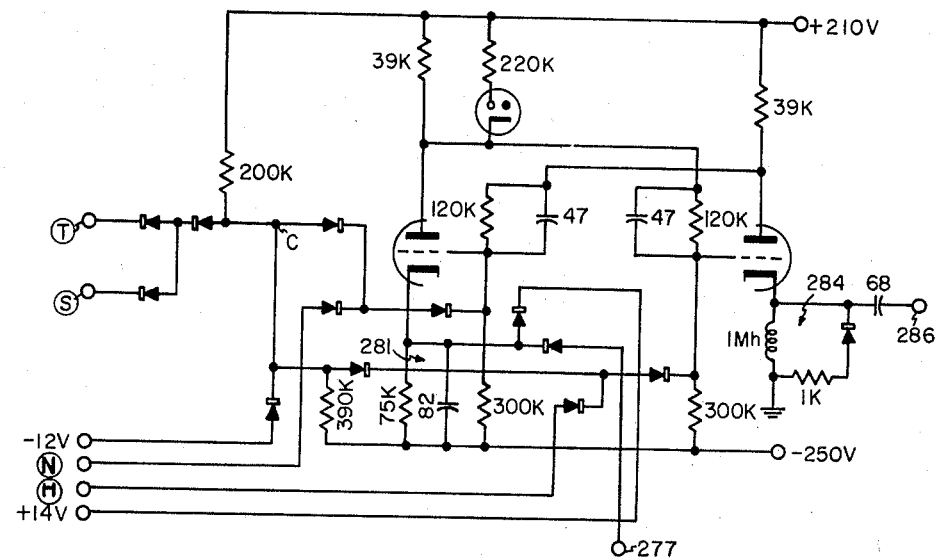
FIG. 10 is a circuit diagram of a flip-flop circuit of the type used throughout the computer and in the first three stages of FIG. 9.
Figure 11:
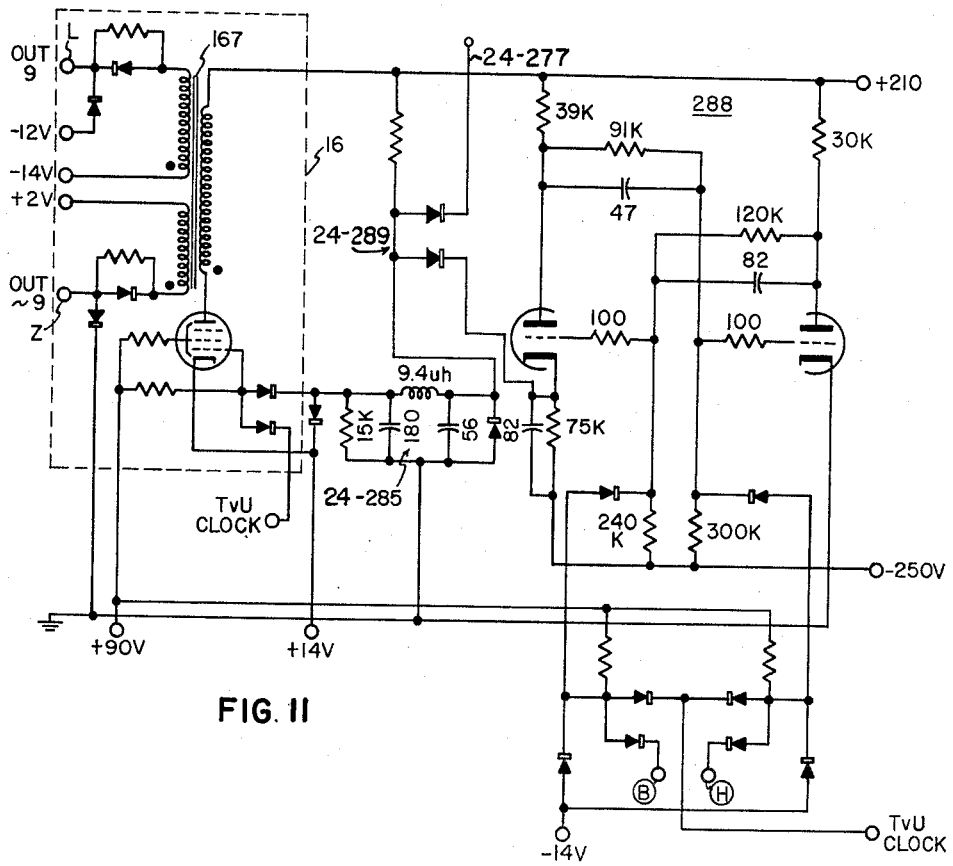
FIG. 11 is a circuit diagram of a flip-flop circuit of the type used in the last stage of FIG. 9 and which has a delay-line coupling and a pulse amplifier output.

In general, each of the first three stages of the binary counter is a circuit such as that shown in FIG. 10 and the fourth stage is a circuit such as that shown in FIG. 11. Note that the output circuit of the flip flop at terminal 286 is coupled to a pulse forming damped inductive circuit 25–284. Thus, no output signal is obtained in either the static set or reset condition of the first three flip flop stages, but is obtained only when the initial transition current occurs as the flip flop is reset. This permits the direct triggering of the counter circuits with pulse waveforms, and produces output pulses which may be used directly in other system circuits.

Figure 8:
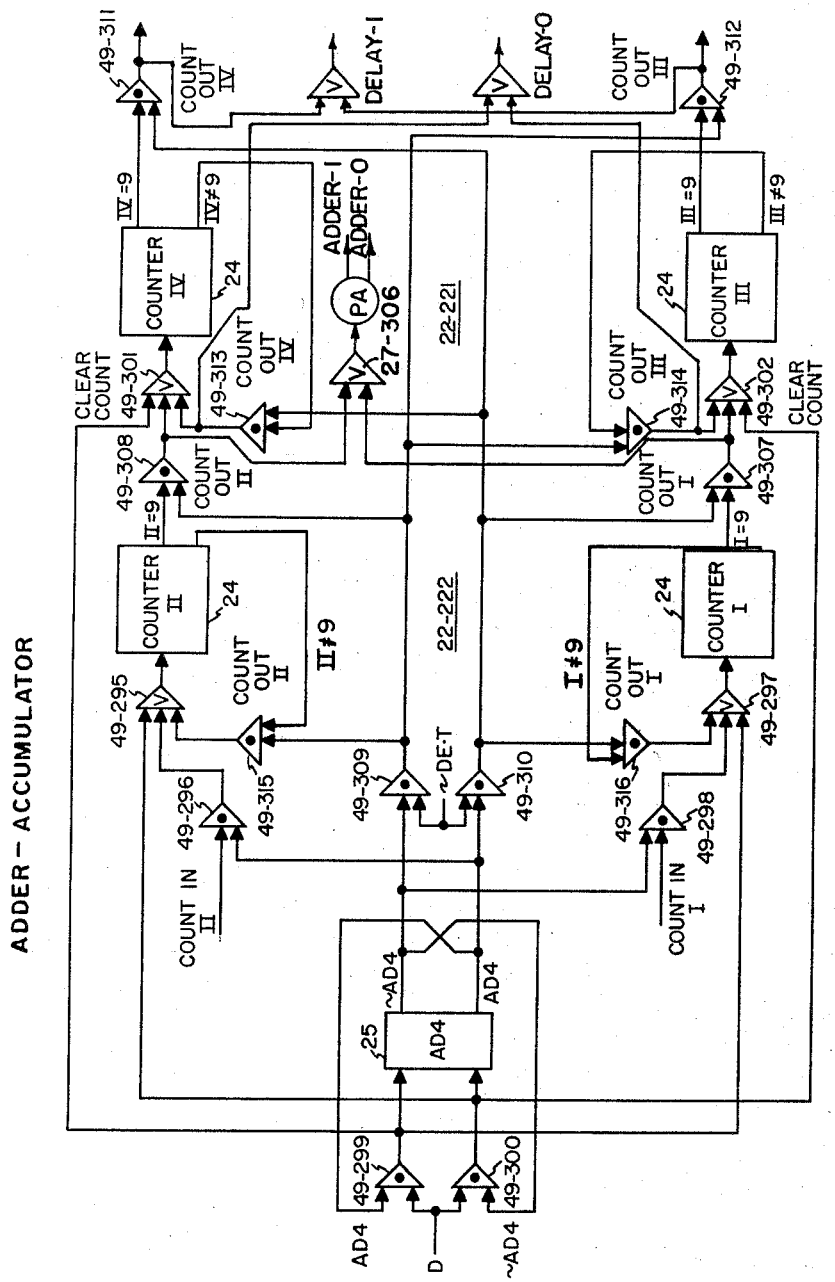
FIG. 8 is more detailed schematic circuit of the delay elements of FIG. 7 used in conjunction with the accumulator-adder portion of the A register.
Figure 9:
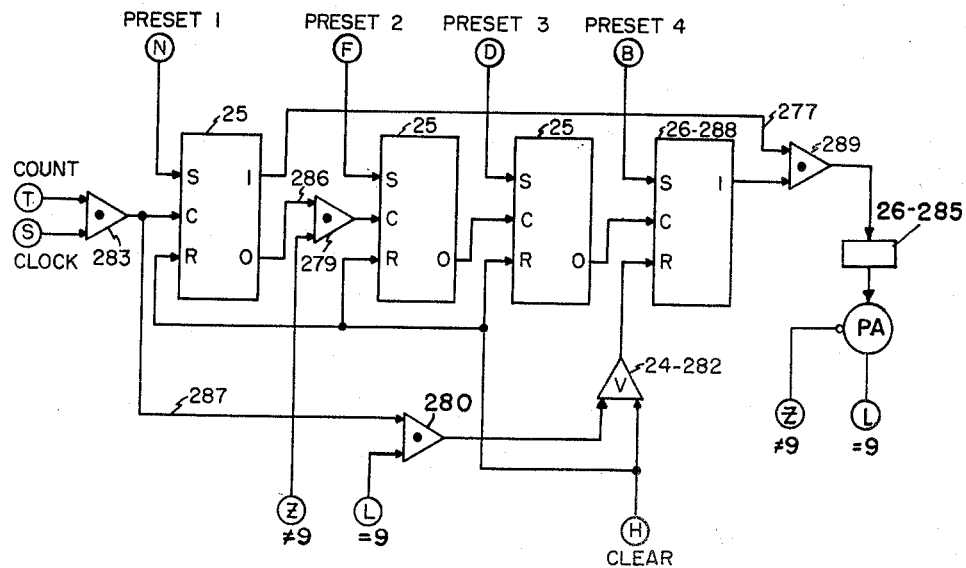
FIG. 9 is a more detailed schematic circuit of the counters of FIG. 8 used throughout the computer and showing counter inputs and outputs.

Thus, the counter circuits of FIG. 8 are caused to provide a one digit delay by storing ten bit pulses or one decimal digit. Count-in requires one digit time and count-out can only occur during the following digit time. Counters similar to those shown in FIG. 9 may be preset and counted out without the one digit delay. Circuit construction is simplified by performing addition in the accumulator loop with the same basic counters in which the delay is provided for the shifting operation. The alternator flip flop circuit AD4 is provided to cause one counter to be read-out as the alternate counter is read-in. In general, all of the flip flop circuits may be constructed as shown in the embodiment of FIG. 10 where direct current output signals may be taken from cathode circuits of both tubes at respective terminals such as 25–277. The resistive cathode circuit 25–281 produces a static indication of the tube condition rather than the pulsed output signal produced at terminal 25–286 by the inductive cathode circuit 25–284.

Figure 15:
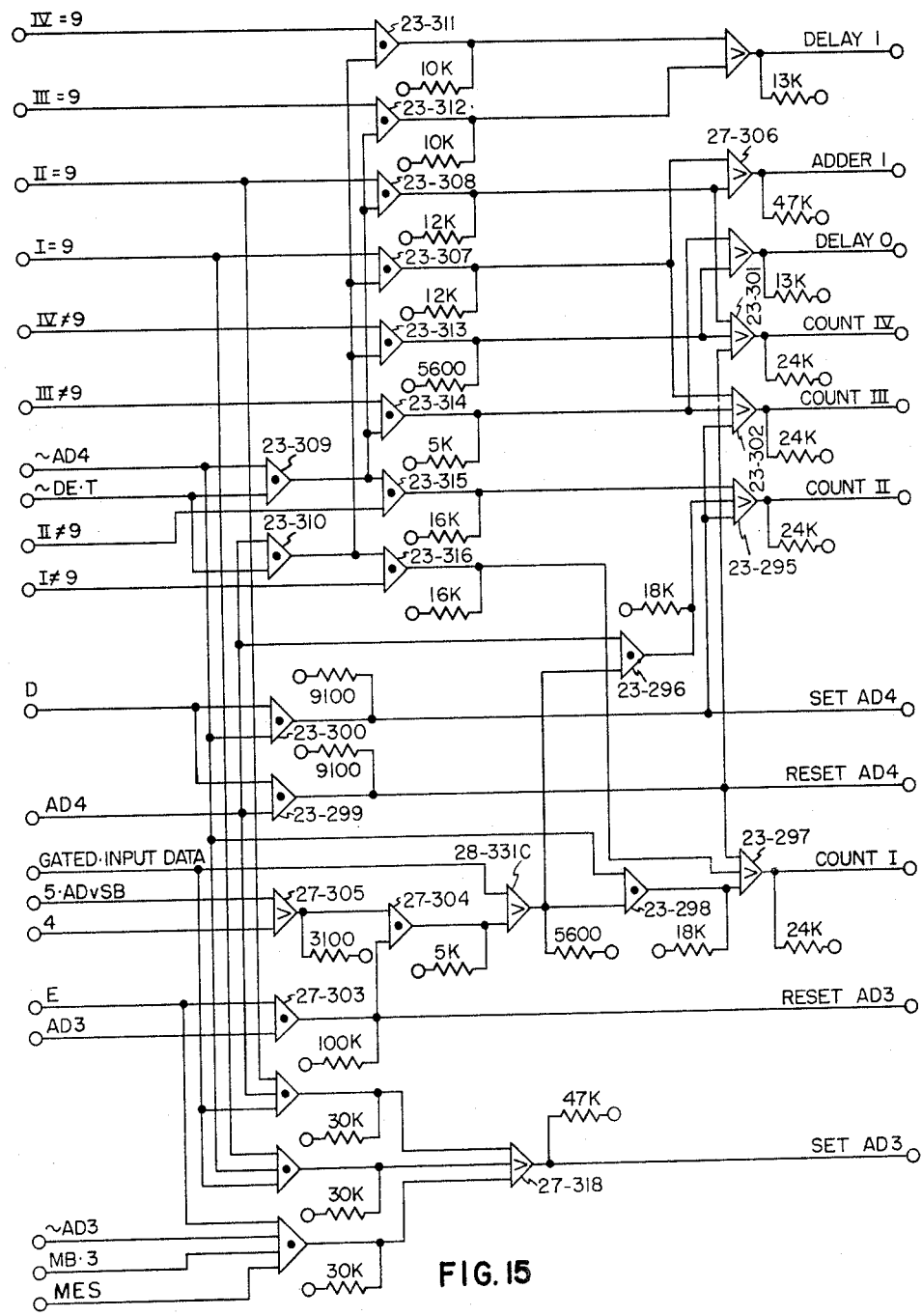
FIG. 15 is a logical circuit diagram of inputs to the accumulator counters, alternator flip flop and carry flip flop.

The output terminals of the alternator AD4 in FIG. 8 are fed back by cross connections to input gating circuits 49–299 and 49–300 which are actuated by coincident digit clock pulses D to thus provide alternate output signals remaining for the duration between consecutive D pulses, as designated at the two output leads AD4 and ~AD4. These signals are used to turn to count in alternate decimal digits at the respective counters I and II, and conversely to enable the counting out of one counter while counting in is taking place at the other counter. More detailed circuit conditions are shown in the diode control circuit section, FIG. 15, where similar reference characters 295–302 are shown to facilitate comparison. In like manner, other logic circuits may be traced through the diode control circuit sections.

The counter circuits of FIG. 8, in order to afford the digit delay interval used in the accumulator loop, are constructed for a count-in of the decimal digit during one digit time and a count-out at the succeeding digit time. Therefore, separate input gates 49–296 and 49–315 or 49–298 and 49–316 are respectively provided for count-in and count-out operation for the corresponding counters II or I. The input gates 49–296 and 49–298 of counters II and I are connected to the alternator terminals AD4 and ~AD4 respectively. Every other digit of each input word which enters the accumulator must be processed through either the upper or lower counting chain, and the digits are thereafter recombined at the output circuits. The same alteration program is effected at the respective counters III and IV. As before shown in connection with FIG. 7, the cascade connection through two delay circuits 23–222 and 23–221 is utilized only in order to produce left shift operation, whereas the presentation of output signals after a single decimal digit delay permits no-shift operation. It may be seen with the circuit of FIG. 8 that the shift delay is available in such form that it simplifies the addition process. In performing addition, provision is made for counting alternate digits into the separate counter circuits I and II in the manner hereinafter described in connection with FIG. 12. Digit position DP0 in memory contains the sign digit, but in the accumulator loop of FIG. 7 DP0 is left blank and the sign is stored in a flip flop circuit AD1, and is handled separately in the sign comparator circuit 86, FIG. 12, during addition.

*The Adder Circuits*

The adder circuit of FIG. 12 is broken up in four sections; 290, 291, 292 and 86 respectively denoting the count-in circuits, count-out circuits, carry and sign comparison circuits. The add instruction AD serves to algebraically add the contents of a specified memory location to the contents of the accumulator, by means of the adder input lead, FIG. 12, and thereafter leaves the sum in the accumulator. Addition is performed serially by counting bits from two digit sources into a single adder counter (counter I or II) one bit at a time, and holding any carry signal for addition with the succeeding digit. Digits from the accumulator track are counted in at T time and those coming from the memory or B register are counted in at U time, via a 6.5 microsecond delay, so that the digit bits may be interspersed or staggered in time relationship. Thus, the counting rate is 156,000 cycles per second or twice the normal bit presentation rate throughout other computer circuits. Digits which are counted into counter I and II are counted out during the following digit time. To count out of the counter, nine T pulses (~DE.T) are applied to the count input terminal at gates 49-316 and 49-315 of counters I and II. These pulses continue to advance the counter until it reads 9. The rest of the nine T pulses are then gated through gates 49-308 and 49-307 to form the output digit. Counters I and II are always advanced to the count of 9 by 9 T pulses (~DE.T) and, when the alternator AD4 is shifted by the next following D pulse, one more pulse will enter one of the counters from gate 299 or 300, which will count it to the count of 10, leaving it in the clear condition. When counter I reaches the count of 9, it conditions one of the gate inputs to gate 49-318 and upon the arrival of the 10th adder input pulse from 49-298, carry flip flop AD3 is set. The carry signal is held in flip flop AD3 for presentation with the next succeeding decimal digit at E time through gate 49-303. As an example of the operation of the adder counters, consider first that the alternator AD4, is set to AD4 for digit time DT1. The two digits to be added are a 4 and a 7. If the 7 is from the accumulator track, it is counted into the adder input, FIG. 12, by seven pulses during seven successive T times, and the 4 is counted into the adder input from the memory during four successive U times interspersed with the T times. Since alternator AD4 is set at AD4, counter II will receive the eleven input pulses through gate 49-296, leaving counter II containing a count of "1." As counter II passes through 9, it conditions one of the input gates to the buffer 49-318 so that the 10th count reaching counter II will also set the carry flip flop AD3. During the next following digit time starting with a D pulse at alternator AD4, ~AD4 activates gate 49-309 and the nine T pulses (~DE.T) are applied to gate 49-315 and count through the buffer 49-295 to count counter II up to the 9 condition. When counter II reaches 9, the input II≠9 inhibits gate 49-315, leaving counter II at the count of 9, and counter II=9 activates gate 49-308, allowing the remaining T pulses, which, in this case would be the last T pulse of the nine count, to arrive at gate 49-306 and appear as an output Adder-1. The first D pulse arriving after the ~AD4 sets the alternator AD4 and simultaneously clears counter II by applying the 10th count to counter II at the end of the ~AD4 condition, as shown at gate 49-300. During the AD4 condition, the 10th count to counter II had previously set the AD3 carry flip flop and the D pulse which caused the ~AD4 condition which is followed by an E pulse. As seen at gate 49-303 of FIG. 12, this E pulse during state 4 causes a single carry pulse to arrive as an input to both gates 49-296 and 49-298. Since the alternator is now in the ~AD4 condition the carry arrives at gates 49-298, 49-297 and is transmitted into counter I as a carry. Since the E pulse that triggered the carry occurred before the first possible T pulse or U pulse at the adder input, a count of one in the next higher order digit is preset prior to the count-in operation for that digit.

The add instruction AD or subtract instruction SB is necessary to cause the contents of a specified memory location to be added to the accumulator loop as shown in FIG. 13. Various conditions for providing an adder input signal from the drum or keyboard are shown in the accumulator input circuits of FIGS. 13, 14 and 15. During the addition cycle, the track selection is made during state 1, and the sector address is found during state 2. The actual addition takes place during state 4. By means of the partial digit distributor circuit 3-88 of FIG. 6, the sign of the memory word is read into the flip flop circuit AD2 during digit time DT0 by gating ~DD1 with state 4 and MEM-1, the sign of memory. The flip flop circuit AD1 already has been conditioned with the sign of the accumulator contents. After the complete sign digit from memory is read-in, and at the tenth bit time of DT0, complement control flip flop circuit AD2 is set by a D pulse if the signs are opposite and reset if the signs are the same as shown in FIG. 12. Whenever the signs are opposite, the numerical portion of the word from memory is complemented by sending memory "0's" to the adder instead of memory "1's," as shown in FIG. 13. This produces a 9's complement which is changed to a 10's complement by sending a pre-carry bit E pulse into the adder during the tenth bit time of DT0, as schematically indicated at the input circuit of the adder 27-290, FIGS. 12 and 13.

During digit times DT1 and DT12 the bits from the accumulator tracks enter the adder input circuit at T time and the bits from the memory enter at U time as indicated respectively by the gates 48-338 and 48-343, FIGS. 13 and 14. A carry is stored in the flip flop circuit AD3 and is sent to the adder between digits at E time so that it will be added to the next digit. At W time, after addition, flip flop circuits AD2 and AD3 are inspected by signals. AD3 indicates an overflow of the MSD, and ~AD2 indicates unlike signs. If the signs are the same and there is no carry for a normal operation, which is the case with AD2 and AD3 reset, the sum is in absolute value form and the sign of the sum is correct in AD1. In this case the state selector goes to state 0 to wait for the next instruction indicating that the normal addition is completed. If the signs are opposite and there is a carry, as occurs when AD2 is set and AD3 is set, there has been a proper addition of the complement, and the same situation holds. The state counter goes to 0. However, if the signs are opposite and there is no carry, AD2 and AD3 being in the set and reset condition, the sum is in complement form. In this case control changes to state 5, in which the accumulator is complemented as seen in FIGS. 12 and 13, and provided with a correction pre-carry signal, as seen in FIGS. 12 and 13. Also the storage state of AD1 is changed in state 5 by a W pulse to give the correct sign as well as the absolute value of the sum after which control goes back to state 0. When the signs are the same and there is a carry, with AD2 reset and AD3 set, the number in the accumulator exceeds the capacity of the register. In this case the alarm thyratron circuit is fired. Also the flip flop circuit CN4 which is hereinafter discussed, is reset to prevent the stepping switch from proceeding to the succeeding instruction and sends the control state to 0. The state 5 complementing operation gates AR-0 through the adder with a pre-carry which gives the proper 10's complement.

In order to perform the subtract instruction, the operation is entirely identical to the adding operation except that the sign of the word in the memory is complemented as it is sent to the flip flop circuit AD2 during digit time DT0 by gating ~DD1 with state 4 and MEM-0.

In FIG. 13 the entire accumulator loop is denoted together with the adder of FIG. 12 and its plurality of input conditions. These input conditions may be traced throughout the diode logic control circuits, for example, in FIGS. 14 and 15, where cross referenced identification characters are supplied to facilitate tracing of the circuits. An electronic adder has been described which performs the functions of an arithmetic adder, and which also functions as a storage register thereby eliminating the need for extra registers usually needed during division and multiplication operations. The adder comprising the present invention also contains sign sensing circuits that determine whether the sign of the result of an arithmetic operation is negative or positive.

What is claimed is:
1. An electronic adder circuit for adding a plurality of sequentially presented pulse count coded decimal digits comprising a word comprising in combination, two decimal counters, means for storing alternate decimal digits presented in sequence throughout the duration of said word into respective ones of said counters, and means for alternately counting out and recombining in sequence the digits stored in said decimal counters.

2. A decimal adder circuit comprising in combination, a decimal counter circuit coupled for preset to decimal "0" and adapted for producing an output signal for a decimal count of "9," means coupled for sequentially counting bits of a decimal digit into the preset counter during one sequential digit time, means operable to produce a carry signal responsive to a "9" count, means for storing the carry signal for one digit time period, means for counting the carry in between sequentially arriving decimal bits of the subsequent digit time, a separate counter circuit connected for similar operation upon an alternate decimal digit, and means for counting out the stored decimal digit of one counter circuit as the succeeding decimal digit is counted into the other counter circuit.

3. Arithmetic circuits associated with an electronic adder circuit for processing two numerical words comprising in combination, an accumulator circuit connected for holding one word and storing the results of arithmetic computations, flip flop circuit means for storing signs of the two words, one flip flop being associated with the accumulator word, a matrix circuit coupled to said flip flop circuit means for comparing different sign combinations, and logical circuit means coupled to the matrix circuit to set the accumulator sign flip flop circuit to the sign resulting from the arithmetic operation.

4. An electronic adder circuit for adding a plurality of sequentially presented pulse count coded digits which represent two words of data comprising, two decimal counters, means for gating digits of alternate word orders into alternate ones of said counters throughout the presentation of the two words to the counters, and means cooperating with said counters and said gating means for recombining the outputs of said two counters in timed sequence for a single sum of said two words of data.

5. An electronic adder system for adding two pulse coded digital numbers comprising in combination, two electronic counters for receiving and storing up to nine pulses, means for simultaneously gating digits of said two pulse coded digital numbers into alternate ones of said electronic counters, means for storing the tenth pulse received by either one of said two electronic counters and subsequently emitting a pulse count to the other one of said two electronic counters, control means for counting the digit stored in alternate ones of said two electronic counters while the other of said counters is receiving an input, said control means resetting said counter by counting said stored digits, and gating means cooperating with said electronic counters and said control means for combining the stored digits alternately counted out of said electronic counters.

6. A decimal adder circuit for adding a plurality of decimal order digits comprising in combination, a first decimal counter circuit feedback coupled for reset to decimal "0" on the receipt of a tenth input pulse and adapted to store pulse counts up to and including a count of nine, flip flop storage means set at the count of nine by said first counter to receive the tenth input pulse to said counter, a second decimal counter circuit operable to receive any pulse stored in said flip flop storage before while in a reset state, timing control means for counting the pulses of similar order digits into one counter while simultaneously counting out the sum of the next lower order from the other counter, said timing means being operable to reset said flip flop storage means and precount one pulse into the counter receiving the pulses of similar order, and accumulator storage means cooperating with said timing control means for receiving the output sums of said counters.

7. Arithmetic sign control circuits in an electronic adder system for obtaining the sign of the sum of two numerical words of different sign designation comprising in combination, a first flip flop for storing the sign of the addend, a second flip flop for storing the sign of the augend, and gating means for simultaneously comparing the sign of the augend and addend.

8. In the combination according to claim 7 including a complement control means for changing sums having different sign designations and no overflow carries to the complement of the sum produced by said adder system.

9. In an electronic adder circuit for adding a plurality of sequentially presented pulse count decimal digits, a sign sensing circuit comprising, a flip flop for indicating dissimilar signs of the addend and augend, an overflow carry detection device, a sign comparison control device for indicating that an overflow carry and dissimilar sign are the result of a proper addition of a negative and positive number.

10. In an electronic adder circuit for adding a plurality of sequentially presented pulse count decimal digits, a sign sensing circuit comprising, a flip flop for indicating dissimilar signs of the addend and augend, an overflow carry detection device, and a sign comparison control device for indicating that the absence of an overflow carry and dissimilar signs are the result of a sum in complement form.

11. An accumulator loop for adding a plurality of sequentially presented addend pulse coded decimal digits to a second plurality of augend pulse coded decimal digits stored in the accumulator loop comprising in combination, a first and a second electronic connectible counter in the accumulator loop circuit each having a common input for receiving pulses representing the addend and the augend and carry digits, an alternator distributor for presenting the addend, augend and carry pulses alternately to said first and said second electronic counters, storage means in the accumulator loop circuit for recording in time division the pulse coded decimal digits of the augend, said storage means being connectible to the input of alternate ones of said electronic counters and connected to the output of said counters to receive the sum, a carry detection device connected to the output of said counters and connectible to the input of alternate ones of said counters by said alternator distributor, and control means cooperating with said alternator, said counters and said carry detection device for presenting pulse coded digits of the addend, augend and carry to alternate ones of said counters and counting the sum out of said counters into said storage means in the accumulator loop.

12. An electronic adder circuit coupled into an accumulator storage register comprising, means for storing all the digits of a word except one digit, two electronic decimal counters alternately operable to store alternate digits of a word, and control means for storing one digit of said word in said electronic decimal counters.

13. An adder delay storage system comprising, means for storing all the digits of a word except one, an electronic pulse count adder consisting substantially of two electronic decimal counters, and control means for storing one digit of said word in said adder.

14. In a combination according to claim 13 where only one of said two electronic decimal counters is operable to store a digit of a word during any particular digit time.

15. In a combination according to claim 13 wherein said two electronic counters are alternately operable to receive simultaneously pulses representative of two digits to be added and reversely alternately operable to store the digits being added, whereby count in and count out delays of a pulse count adder are reduced.

16. In an electronic adder circuit for adding a plurality of sequentially presented pulse count decimal digits, a sign sensing circuit comprising, a flip flop for indicating dissimilar signs of the addend and augend, an overflow carry detection device, a sign comparison control device for indicating that the absence of an overflow carry and dissimilar signs are the result of a sum in complement form, and a complement control device for changing the complement sums to absolute sum having the correct sign designation.

17. A serial pulse count adder for adding two words consisting of a plurality of serially presented digits comprising, two electronic counters alternately operable to receive simultaneously pulses representative of two words to be added, alternator control means for determining which of said electronic counters is operable to receive said digits and to determine which of said counters is to be operable to store the sum of said simultaneously received digits, and means for alternately counting out and recombining in sequence the digits stored in said counters.

18. A decimal adder circuit comprising in combination, a decimal counter circuit coupled to be cleared to decimal "0" and adapted for producing an output signal for a decimal count of "9," means coupled to said counter for sequentially counting and storing bits of a decimal digit into the cleared counter during one sequential digit time, means operable to produce a carry signal during one digit time period, means for counting the carry in between sequentially arriving decimal bits of the subsequent digit time, a separate counter circuit connected for similar operation upon the subsequent decimal digit, means for causing the stored decimal digit of one counter circuit to be counted out as the subsequent decimal digit is counted into the other counter circuit, a source of periodically presented clock pulses, and means for gating the clock pulses at the decimal count of "9" continuously for all clock pulses arriving after the counter is in the decimal "9" count.

19. A decimal arithmetic circuit for electronic computers comprising in combination, a source of clock pulses, a decimal counter circuit, input count signal means for said counter circuit providing signals at clock pulse times, means for detecting an output of "9" in the decimal counter circuit, output circuit means gating all of the clock pulses presented while the counter remains in a count of "9" as output pulses, means for resetting the counter to "0" upon a further input count signal arriving at a specified clock pulse time so that a group of output pulses has been presented prior to the time specified for a count of "10" in said counter, and means responsive to the decimal numbers represented by the number of output pulses in the group.

20. A serial pulse count adder for adding two words consisting of a plurality of serially presented digits comprising; two electronic counters alternately operable to receive simultaneously pulses representative of two words to be added; alternator control means for determining which of said electronic counters is operable to receive said digits and to determine which of said counters is to be operable to store the sum of said simultaneously received digits; sign sensing means associated with said adder including, an accumulator circuit connected for holding one word and storing the results of arithmetic computations, flip-flop circuit means for storing signs of the two words, one flip-flop being associated with the accumulator word, a matrix circuit coupled to said flip-flop circuit means for comparing different sign combinations, and logical circuit means coupled to the matrix circuit to set the accumulator sign flip-flop circuit to the sign resulting from the arithmetic operation.

21. An accumulator loop for adding a plurality of sequentially presented addend pulse coded decimal digits to a second plurality of augend pulse coded decimal digits stored in the accumulator loop comprising in combination; a first and second electronic connectible counter in the accumulator circuit each having a common input for receiving pulses representing the addend and the augend and carry digits; an alternator distributor for presenting the addend, augend, and carry pulses alternately to said first and said second electronic counters; storage means in the accumulator loop circuit for recording in time division the pulse coded decimal digits of the augend; said storage means being connectible to the input of alternate ones of said electronic counters and connected to the output of said counters to receive the sum; a carry detection device connected to the output of said counters and connectible to the input of alternate ones of said counters by said alternate distributor; control means cooperating with said alternator, said counters, and said carry detection device for presenting pulse coded digits of the addend, augend, and carry to alternate ones of said counters and for counting the sum out of said counters into said storage means in the accumulator loop, a sign sensing circuit associated with said accumulator loop including, a flip-flop for indicating dissimilar signs of the addend and augend, an over-flow carry detection device, a sign comparison control device for indicating that an over-flow carry and dissimilar signs are the result of the proper addition of a negative and positive number.

22. An arithmetic unit into which two data words are entered in a serial fashion comprising a cyclically movable storage medium including a plurality of storage locations for storage of data words, means gating said two data words for serial entry into said arithmetic unit, a first source under control of said storage medium for generating first timing signals wherein said timing signals occur at a frequency equal to the frequency of passage of pulses making up a first of said data words, a second source under control of said storage medium for generating second timing signals wherein said timing signals occur at a frequency equal to the frequency of passage of pulses making up a second of said data words, said first and said second timing signals occurring in interlaced timed relationship in order to enter individual pulses of said two data words into said arithmetic unit through said gating means in an interlaced fashion at twice the frequency of occurrence of pulses of each said data word.

23. An arithmetic unit into which two data words are entered in a serial fashion comprising a rotating magnetic member having a timing portion and a data storage portion, said data storage portion being capable of storing at least a first and a second separate data word, the respective bits of each word being phase displaced with respect to one another, means for reading out said two words in serial fashion on a pulse-by-pulse basis, an adder for receiving and adding the respective pulses of each of said two words, a first and a second series of timing signals derived from the timing portion of said magnetic member, the individual timing signals of each said series being interspersed with respect to one another, gating means under control of said respective individual series of timing signals for passing the serial pulses of each of said two words into said adder, the corresponding bit pulses of said two words thereby being entered into said adder having a different phase with respect to one another.

References Cited in the file of this patent

UNITED STATES PATENTS

| | | |
|---|---|---|
| 2,775,402 | Weiss | Dec. 25, 1956 |
| 2,793,806 | Lindesmith | May 28, 1957 |
| 2,823,855 | Nelson | Feb. 18, 1958 |
| 2,895,671 | St. Johnston | July 21, 1959 |
| 2,913,175 | Williams et al. | Nov. 17, 1959 |
| 2,974,866 | Haddad et al. | Mar. 14, 1961 |
| 2,991,010 | Dickinson | July 4, 1961 |
| 2,996,249 | An Wang | Aug. 15, 1961 |

OTHER REFERENCES

Progress Report (2) on the EDVAC, vol. 1, The University of Pennsylvania, Moore School of Electrical Engineering, Oct. 7, 1949 (pages 1-1-8 to 1-1-11 and FIG. 1 relied on).